Feb. 5, 1929.

H. T. HERR ET AL 1,701,371

SCAVENGE AIR APPARATUS

Original Filed March 31, 1927   2 Sheets-Sheet 2

WITNESSES:
E. Lutz.

INVENTOR
H. T. Herr, &
A. T. Kasley
BY
A. B. Reavis
ATTORNEY

Patented Feb. 5, 1929.

1,701,371

UNITED STATES PATENT OFFICE.

HERBERT T. HERR, OF MERION, AND ALEXANDER T. KASLEY, OF MOORES, PENNSYLVANIA, ASSIGNORS TO WESTINGHOUSE ELECTRIC & MANUFACTURING COMPANY, A CORPORATION OF PENNSYLVANIA.

SCAVENGE-AIR APPARATUS.

Substitute for application No. 179,815, filed March 31, 1927. This application filed May 11, 1928. Serial No. 277,048.

This application is a substitute for application Serial No. 179,815 filed March 31, 1927, and is an improvement upon the construction shown in the application of Henry F. Schmidt, Serial No. 118,257 filed June 24, 1926 and entitled Internal combustion engine and in a divisional application thereof Serial No. 237,011, filed December 1, 1927 and entitled Internal combustion engine and generator. Both of the aforesaid applications are assigned to the Westinghouse Electric & Manufacturing Company.

Our invention relates to internal combustion engine power plant apparatus, more particularly of the two-cycle type, and it has for an object to provide simple and effective scavenging apparatus therefor.

A further object of our invention is to provide, in connection with a two-cycle internal combustion engine, improved blower apparatus for supplying scavenging air to the engine.

A further object of our invention is to provide a connected two-cycle internal combustion engine and generator supported by a common frame, the frame forming, with respect to the generator, a scavenge air supply chamber, which is adapted to be placed in communication with the engine cylinders, together with apparatus for supplying air to the supply chamber including a blower driven from the generator through speed-increasing gearing.

A further object of our invention is to provide a connected two-cycle internal combustion engine and generator installation, wherein the generator is driven through speed-increasing gearing from the engine, together with scavenging apparatus for the engine including a blower driven through speed-increasing gearing from the generator shaft.

In our application, Serial No. 179,814, filed March 31, 1927, we have disclosed and claimed a type of polyhedral engine incorporating a built-up frame construction having two-cycle internal combustion engine means surrounding and supported by the frame construction. The frame construction is formed to provide a scavenge air supply chamber which is adapted to communicate with the engine cylinders to supply the latter with scavenging air at proper times. The generator is supported by the frame construction. More particularly, an object of the present invention is to provide an engine frame of this character together with a generator depending therein, the generator and the frame cooperating to provide a scavenge air supply chamber for supplying air to the engine cylinders at proper times, the chamber being supplied with air from a suitable blower; and, in order to simplify the mechanical construction and to minimize the amount of space required for an installation, in accordance with our present invention, blower apparatus is carried by the generator and connected by suitable conduits to the scavenge air supply chamber.

These and other objects are effected by apparatus made in accordance with our invention as will be apparent from the following description taken in connection with the accompanying drawings, forming a part of this application, in which.

Figure 1:
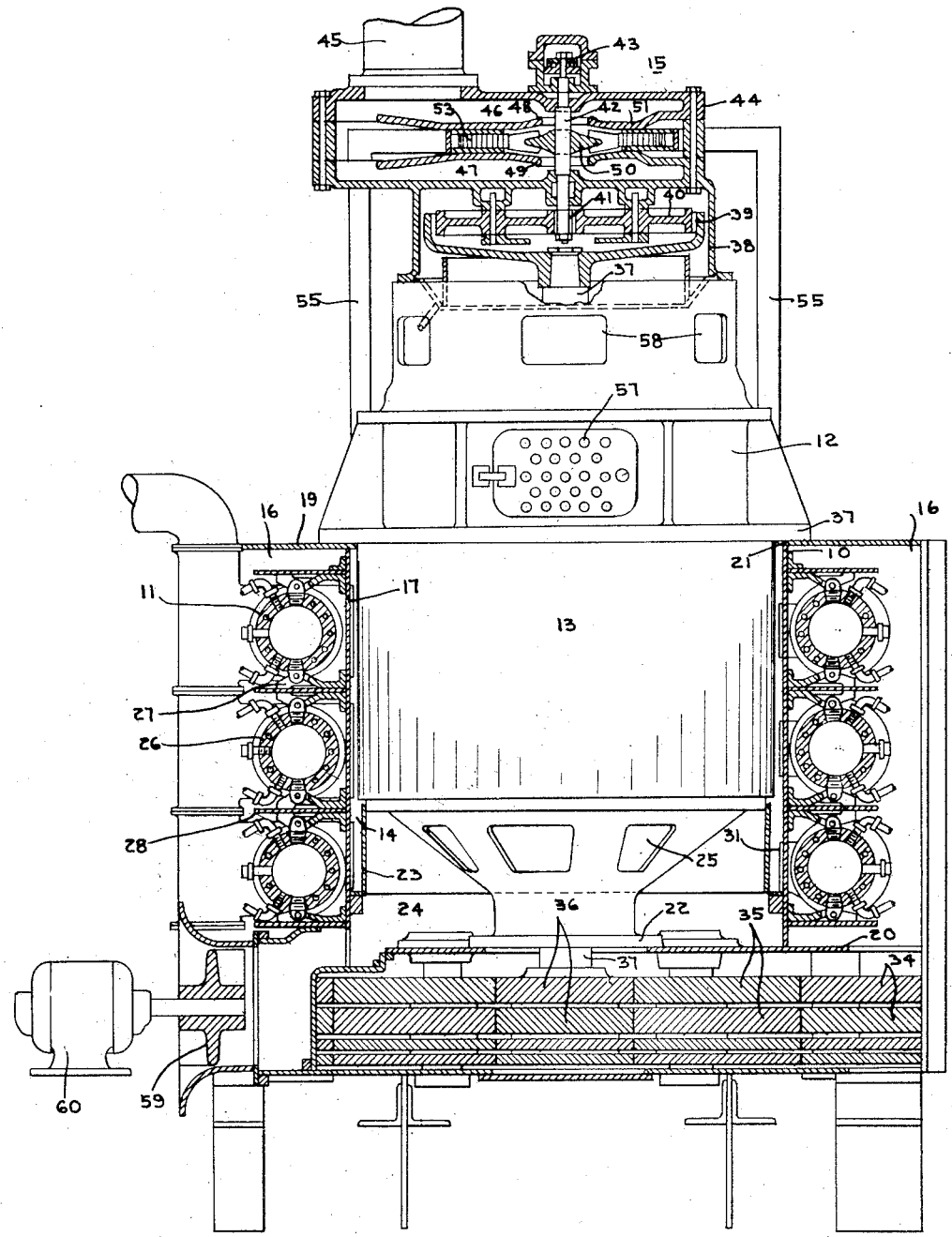
Fig. 1 is a view showing the frame construction and the blower apparatus in section and the generator in elevation.
Figure 2:
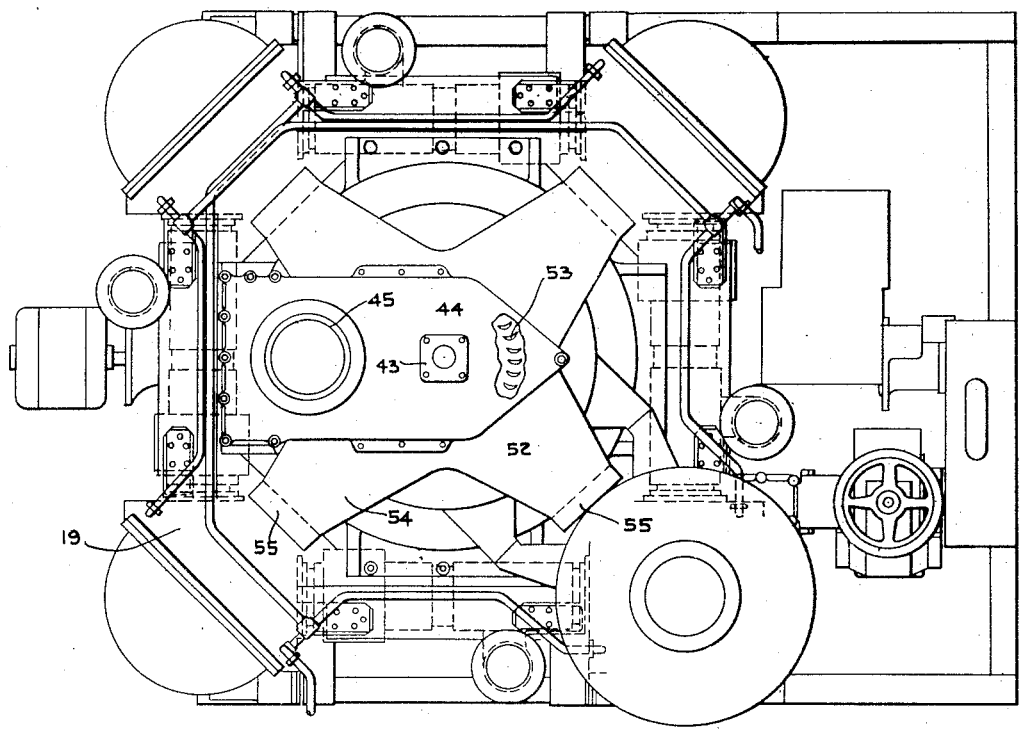
Fig. 2 is a top plan view of our improved power plant apparatus.
Figure 3:
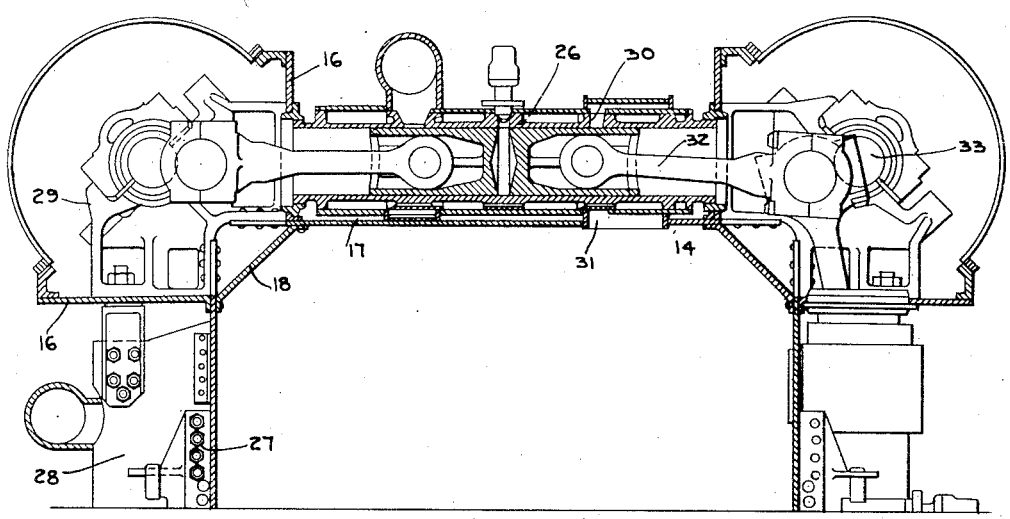
Fig. 3 is a fragmentary detail sectional view showing the relationship of engine means and frame structure.

Referring now to the drawings more in detail for a better understanding of our invention, we show, at 10, a vertically disposed prismatic or tubular frame for supporting the engine means 11, and a generator 12. The generator has a lower portion 13 which depends within the frame construction and cooperates with the latter to provide a scavenge air supply chamber 14. Blower apparatus is shown, at 15, for supplying air to the chamber 14. The blower apparatus, at 15, is preferably supported by and driven from the generator as hereinafter pointed out.

Referring first to the frame construction, this is shown more particularly, described and claimed in our application aforesaid, and it will be referred to herein only in so far as may be necessary to adequately disclose the present invention. In general, the frame is made up of outwardly extending corner plates 16 connected to side plates 17, the latter plates being joined by corner gusset plates 18 and having transverse or horizontal plates 19 and 20 cooperating therewith.

The upper horizontal plate 19 is provided with an opening 21 adapted to receive the portion 13 of the generator, the latter extending within the engine frame and having its lower end in contact with and secured to the horizontal plate 20 as shown at 22.

Thus, it will be seen that the side plates 17, the gusset plates 18, and the horizontal plates 19 and 20, cooperate to provide a box-like construction defining a chamber surrounding the portion 13 of the generator. This chamber is divided by the septum wall 23 into the scavenge air supply chamber 14, already referred to, and into the generator air cooling supply chamber 24, the latter being supplied with air by any suitable means, and air passing therefrom through the openings 25 between the elements of the generator to cool the latter.

The engine means 11, is of the general polyhedral type and it surrounds and is preferably supported by the frame 10. As shown, the engine means preferably includes cylinders 26 of the two-cycle opposed piston type, the terminal portions of the cylinders being supported by the corner plates 16, while intermediate portions thereof are connected to anchor elements 27, the latter being connected both to the tension plates 28 and to the side plates 17. The tension plates 28 are connected to corner bearings 29, the corner bearings being connected both to the corner supporting plates 16 and to the side plates 17. In this way, a built-up structure is provided which is highly resistant to engine working forces. As the cylinders 26 contain opposed pistons, such cylinders are not subjected to axial working forces, and, therefore, the mounting for the cylinders may be made very light.

Each of the cylinders is provided with scavenging air inlet openings 30 supplied with air through suitable passages 31 in communication with the scavenge air supply space 14, the latter space being supplied with air from the blower at 15.

The opposed pistons in the cylinders 26 are connected, by connecting rods 32, to corner crank shafts 33, carried by the bearings 29. The lower ends of the crank shafts have gears 34 secured thereto and meshing with idler gears 35, the idler gears meshing with a pinion 36 carried by the lower end of the generator rotor shaft 37. Preferably, the diameters of the gear elements 34 and 36 bear such relation to each other as to result in a speed-increasing effect.

The generator is provided, above the portion 13, with feet 37, which rest on the top plate 19 immediately above the side plates 17.

Referring now to the scavenging apparatus, this includes a blower driven by speed-increasing gearing from the rotor shaft 37. To this end, we preferably provide a housing 38 into which projects the upper end of the rotor shaft 37, the latter shaft having connected thereto an internal gear 39 which meshes with idler gears 40, the latter, in turn, meshing with a central pinion 41 connected to the runner shaft or spindle 42. The runner shaft 42 is supported by a thrust bearing 43 on the blower housing 44, this housing having an air inlet 45 which supplies air by way of passages 46 and 47 to the eyes 48 and 49 of the centrifugal blower formed by the runner 50 carried by the shaft 42 and by the radial diffuser housing 51.

The radial diffuser housing is in part preferably formed by a sheet metal construction 52 having a circular series of vanes 53 therein and beyond the vanes the housing is provided with converging outlets 54 connected by conduits 55 with the scavenge air supply chamber 14. The purpose of the vanes, or turbine-like blades 53, is to remove the whirl from air discharged by the runner so that it is directed to flow radially in order that its energy derived from the runner may be highly effective to secure the passage thereof to the scavenge air supply chamber and maintain pressure therein.

In order that the blower apparatus 15 may be made relatively small, we have shown a double provision for increase in speed. First, the generator rotor is driven from the engine crank shafts through speed-increasing gearing; and, second, the generator rotor is connected by speed-increasing gearing with the blower runner. In this way, the blower runner may be caused to operate relatively much faster than a crank shaft and the size of the blower apparatus may be made relatively quite small.

From the foregoing, it will be apparent that the plate elements 17, 18, 19 and 20, cooperate with the generator portion 13 to define an interior chamber, which is divided by the septum wall 23 into the upper or scavenge air supply chamber 14 and into the lower or generator cooling air supply chamber 24, the latter supplying air through the openings 25 for passage upwardly between elements of the generator for cooling the latter and finally being discharged from openings 57 and 58 at the top portion of the generator.

The generator cooling air supply chamber 24 is supplied with air from any suitable means as by the propeller blower 59 operated by the motor 60.

From the foregoing, it will be apparent that we have provided a frame construction for supporting two-cycle internal combustion engine means and a generator, the frame cooperating with the generator to provide a space which is divided into an upper scavenge air supply chamber for supplying scavenging air to the engine cylinders and into a lower chamber for generator cooling air, the latter chamber supplying cooling air to the generator. Also, the scavenge air supply chamber is supplied by a blower operated from the generator through speed-increasing gearing, the generator, in turn, being operated through speed-increasing gearing from the engine, whereby the generator may be driven faster than the engine; permitting of the use of a smaller generator than if the latter operated at engine speed, and whereby the blower may be operated faster than either the generator or the engine in order that the blower may have adequate capacity, occupy a minimum of space, and be supported by the generator. Hence, we have provided a unitary and self-contained internal combustion engine and generator power plant with scavenging apparatus supported by single means, whereby the installation occupies relatively a small amount of space for the power developed and finds peculiar utility in situations where space is limited, as, for example, with railway locomotives.

While we have shown our invention in one form, it will be obvious to those skilled in the art that it is not so limited, but is susceptible of various other changes and modifications, without departing from the spirit thereof, and we desire, therefore, that only such limitations shall be placed thereupon as are imposed by the prior art or as are specifically set forth in the appended claims.

What we claim is:

1. In power plant apparatus, the combination of a generator, an engine supporting frame surrounding a portion of the generator and cooperating with the latter to provide a scavenge air supply chamber, internal combustion engine means supported by said frame, means for supplying scavenging air from said chamber to the cylinders of the engine means, and means located exteriorly of the frame for supplying air under pressure to said chamber.

2. In power plant apparatus, the combination of a generator, an engine supporting frame cooperating with the generator to provide a scavenge air supply chamber, internal combustion engine means supported by said frame, means for supplying scavenging air from said chamber to the cylinders of the engine means, means for driving the rotor of the generator from the engine means, and means driven from the generator rotor and disposed exteriorly of the frame for supplying air under pressure to said chamber.

3. In power plant apparatus, the combination of a vertically disposed generator, a vertically disposed engine supporting frame cooperating with the generator to provide a scavenge air supply chamber, engine means surrounding and supported by said frame and including horizontally disposed cylinders, means for supplying scavenging air from said chamber to the cylinders, motion transmitting means between the engine means and the generator, and means disposed above the frame and generator and operated from the generator for supplying air under pressure to said chamber.

4. In power plant apparatus, the combination of a vertically disposed generator having an intermediate horizontal supporting flange, a frame structure arranged in supporting relation with respect to said flange and cooperating with the generator to provide a scavenge air supply chamber, engine means supported by said frame, means for supplying scavenging air from said chamber to the cylinders of the engine means, and means for supplying air under pressure to said chamber.

5. The combination, with an internal combustion engine, of a generator driven by the engine, a blower including a runner for supplying scavenging air to the engine, and speed-increasing gearing between the generator and the runner.

6. The combination, with an internal combustion engine including a plurality of crank shafts, of a generator, means for transmitting motion from the crank shafts to the generator, and scavenging apparatus for the engine including pressure-developing means driven from the generator and at a different speed therefrom.

7. The combination, with an internal combustion engine, a generator, speed-increasing gearing between the engine and the generator, air pressure-developing and translating means for supplying scavenging air to the engine, and speed-increasing gearing between the generator and said last-named means.

8. In power plant apparatus, the combination of vertically disposed engine-supporting means, a vertically disposed generator supported by said means, said generator having a rotor provided with a shaft, engine means surrounding and supported by the frame and including a plurality of vertically disposed crank shafts, gearing means arranged below the generator for connecting the crank shafts to the rotor shaft, air pressure-developing and translating means for supplying air to the engine cylinders, and gearing interposed between the generator rotor shaft and said last-named means.

9. In power plant apparatus, the combination of a vertically disposed generator, a polyhedral frame having plates cooperating with said generator to provide a scavenge air supply chamber, internal combustion engine means surrounding the frame and supported thereby, means for supplying scavenging air from said chamber to the cylinders, means for transmitting motion from the engine means to the generator, a blower disposed above the frame and generator and having a runner for supplying air to said chamber, and means for transmitting motion from the generator to the runner.

10. In power plant apparatus, the combination of a generator, an engine supporting frame cooperating with the generator to provide separate scavenging air and generator cooling air chambers, engine means supported by the frame, means for supplying scavenging air from said scavenge air chamber to the engine cylinders, separate air pressure-developing and translating means for supplying air to the scavenge air and generator cooler chambers, and means for transmitting energy from the engine means to the air pressure-developing and translating means for the scavenge air supply chamber.

11. In power plant apparatus, the combination of an engine frame including a box-like structure, a generator having a portion extending within the interior space of said structure, a diaphragm cooperating with the generator and with the interior of said structure to divide the interior space of the latter into scavenge air supply and generator cooling air supply compartments, said generator being provided with openings communicating with the generator air cooling supply compartment, internal combustion engine means supported by said frame, means for supplying scavenging air from said scavenging air supply compartment to the cylinders of the engine means, air pressure-developing and translating means for supplying air to the scavenging air supply compartment, and means for supplying the generator cooler air supply chamber with air for passage through the generator.

12. In power plant apparatus, the combination of a supporting frame, an internal combustion engine carried by the frame, a generator carried by the frame, and scavenging apparatus for the engine including a blower carried by the generator and connected thereto through speed changing gearing.

13. In power plant apparatus, the combination of a generator, an internal combustion engine, a frame for supporting the engine and the generator and providing a scavenging air supply chamber, means for supplying scavenging air from said chamber to the engine cylinders, air pressure-developing and translating apparatus carried by the generator for supplying scavenging air to said chamber, means for transmitting motion from the engine to the generator, and means for transmitting motion from the generator to the air-pressure-developing and translating means and for increasing the speed of the air-pressure developing and translating means relative to the generator.

14. In power plant apparatus, the combination of a generator, internal combustion engine means of the opposed piston and polygon type including a plurality of crank shafts, gearing for connecting crank shafts to the generator, scavenging apparatus for supplying scavenging air to the cylinders and including a blower having a runner axially aligned with the generator, and means for transmitting motion from the generator to the runner and for effecting a change in the speed of the runner relative to the generator.

15. In power plant apparatus, the combination of a supporting frame, internal combustion engine means surrounding and supported by the frame, a generator supported by the frame, scavenging apparatus for supplying scavenging air to the cylinders of the engine means including a housing construction supported by the generator, a runner arranged within said housing and carried by a vertical shaft, a thrust bearing arranged between the upper end of the shaft and said housing, a pinion carried by the lower end of said shaft, and gearing means cooperating with said pinion and operated by said generator.

16. In power plant apparatus, the combination of a supporting frame providing a scavenge air supply chamber, two-cycle internal combustion engine means carried by said frame, means for conducting scavenging air from said chamber to the cylinders of the engine means, a generator supported by said frame and having a rotor shaft, means for transmitting motion from the engine means to the rotor shaft, a blower for supplying scavenging air to said chamber and including a runner, and speed-increasing gearing between the rotor shaft and the runner.

17. In power plant apparatus, the combination of a vertically disposed frame, a vertically disposed generator carried by the frame, two-cycle internal combustion engine means carried by the frame, means for supplying scavenging air to the cylinders of the engine means including a blower whose runner is axially aligned with the generator, a runner shaft connected to the runner, an internal gear connected to the generator, idler gears meshing with the internal gear, and a pinion carried by the runner shaft and meshing with the idler gears.

18. In power plant apparatus, the combination of a supporting frame, a generator supported by the frame and including a rotor shaft, two-cycle internal combustion engine means supported by the frame, means for transmitting motion from the engine means to the rotor shaft, and means for supplying scavenging air to the cylinders of the engine means including a blower whose runner is axially aligned with said rotor shaft, an internal gear connected to the rotor shaft, idler gears meshing with the internal gear, and a pinion carried by the runner shaft and meshing with the idler gears.

19. In power plant apparatus, the combination of a frame; a generator supported by the frame, arranged partly within the latter and extending thereabove, the generator co-operating with the frame to provide a scavenge air supply chamber; engine means disposed about and carried by the frame and including cylinders and crank shafts, the cylinders being arranged to receive scavenging air from said chamber; transmission means for interconnecting the crank shafts and the rotor of the generator; a blower arranged above the generator, supported thereby, and driven therefrom; and means for conducting air under pressure from the blower to said chamber.

In testimony whereof, we have hereunto subscribed our names this 10th day of May 1928.

HERBERT T. HERR.
ALEXANDER T. KASLEY.